INVENTOR
CHARLES M. ALLABEN JR.
BY *Evan D. Roberts*
ATTORNEYS.

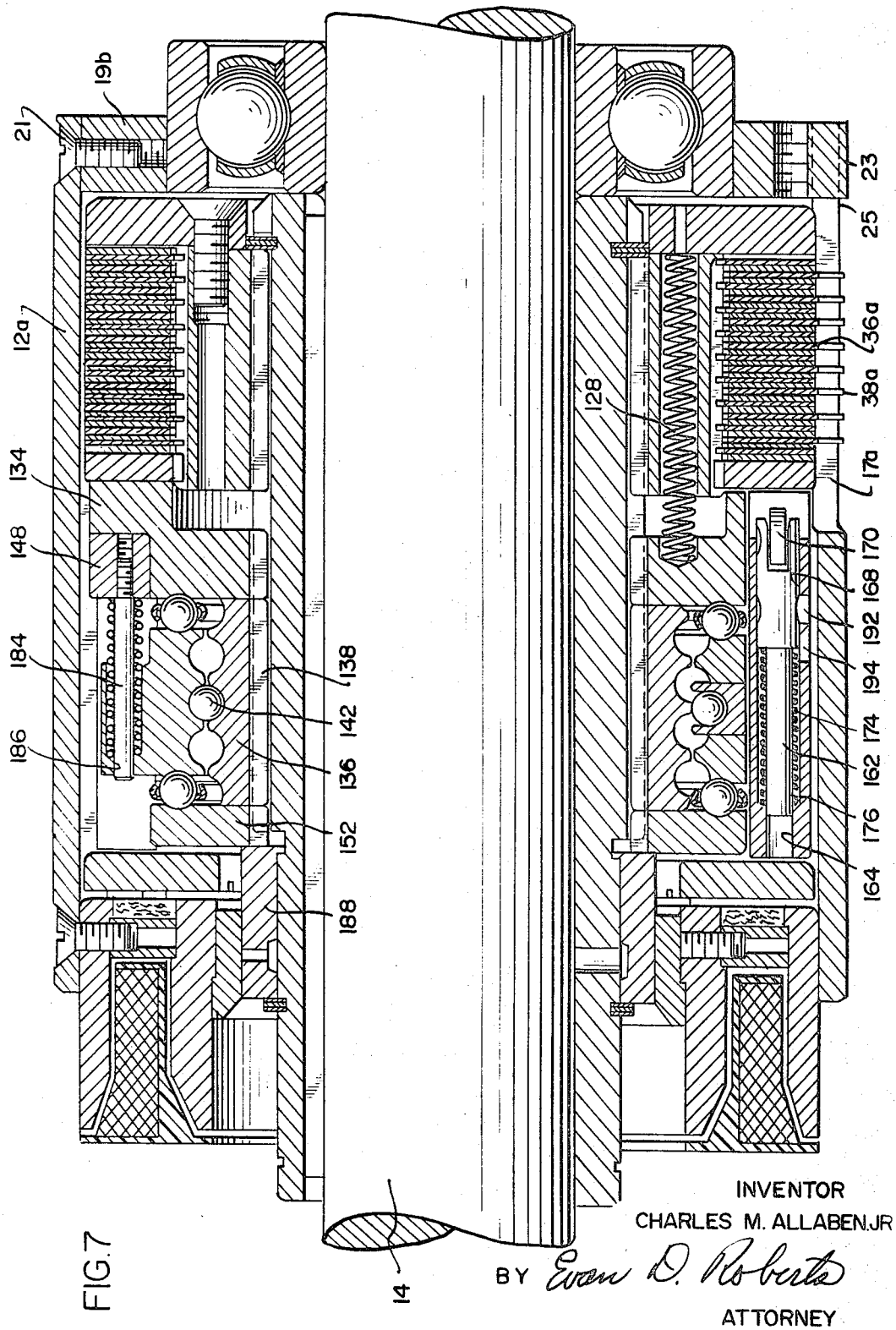

United States Patent Office 3,419,118
Patented Dec. 31, 1968

3,419,118
ELECTROMAGNETICALLY ACTUATED CLUTCH
Charles M. Allaben, Jr., Ithaca, N.Y., assignor, by mesne assignments, to Borg-Warner Corporation, Chicago, Ill., a corporation of Delaware
Filed Dec. 1, 1966, Ser. No. 598,499
12 Claims. (Cl. 192—35)

ABSTRACT OF THE DISCLOSURE

Electromagnetically actuated, force augmented, clutch of the disc pack type.

---

This invention relates to clutches and more particularly to a clutch of the disc pack type in which engagement is effected electromagnetically and in which the initiating force is amplified so that an annular pressure path is formed to compress the disc pack.

Heretofore, electromagnetic clutches have been employed to actuate clutches of the disc pack type and attempts have been made to amplify the initiating force to engage the disc pack. These attempts have generally been unsuccessful in that insufficient force has been produced, for a clutch of a given size fully to engage a disc pack having a particular area of frictional surface. Stated another way, the prior art clutches of this type were not capable of transmitting sufficient torque to keep a disc pack of a reasonable diameter and axial length in engagement.

A further object of the invention is to provide an electromagnetically actuated clutch of the disc pack type which is relatively compact with respect to its torque transmission capabilities, which is positive in its action, and in which the amplified actuating force is exerted evenly through an annular path.

A further object of the invention is, therefore, to provide a clutch of the stated type constructed and arranged so that the initiating force is sufficiently amplified so that relatively great torques may be transmitted through the disc pack.

Another object of the invention is to provide a clutch of the type having an electromagnetically actuated disc pack in which means are provided for preventing the inadvertent engagement of the disc pack due to inertial forces.

Another object of the invention is to provide a clutch of the disc pack type in which engagement is initiated by an electromagnetic pilot clutch and in which the initiating force is amplified so that the annular discs of the disc pack assembly are compressed evenly and with relatively great force. A more particular object of the invention is to provide a clutch of the mentioned character in which a force-amplifying mechanism is provided having a plurality of circumferentially spaced ball screw units for exerting substantially equal pressure on the discs of the disc pack assembly.

Another particular object of the invention is to provide a clutch of the stated type wherein a single screw and nut assembly of relatively large diameter is utilized to exert pressure on the disc pack.

These and other objects of the invention will be apparent as the description proceeds with reference to the accompanying drawings, in which:

FIGURE 7 is a vertical elevational view of a further modified form of the present invention, and;

Figure 1:
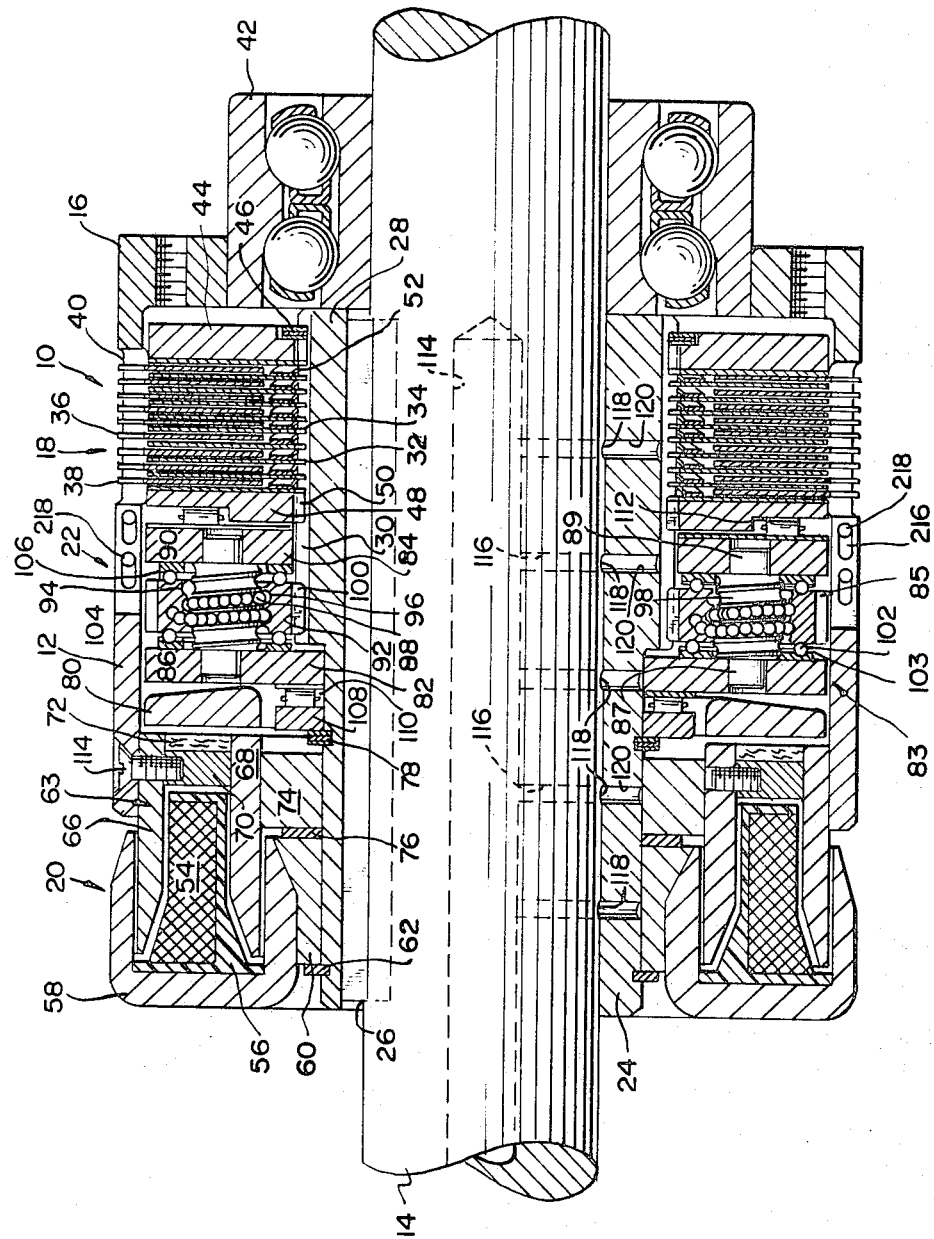
FIGURE 1 is a vertically elevational view of a clutch made in accordance with the present invention, the clutch elements being shown in disengaged condition.

Referring to the drawings and more particularly to FIGURE 1, the clutch of the present invention is indicated generally by reference numeral 10 and includes a housing 12, an input member in the form of a shaft 14, and an output member 16. Torque may be transmitted from the input shaft 14 to the output member 16, through a disc pack assembly 18 upon energization of an electromagnetic actuator or pilot clutch 20. The initial force of the pilot clutch 20 is amplified by a force-amplifying mechanism 22 to exert an axial force through an annular path to compress the disc pack assembly 18.

Figure 2:
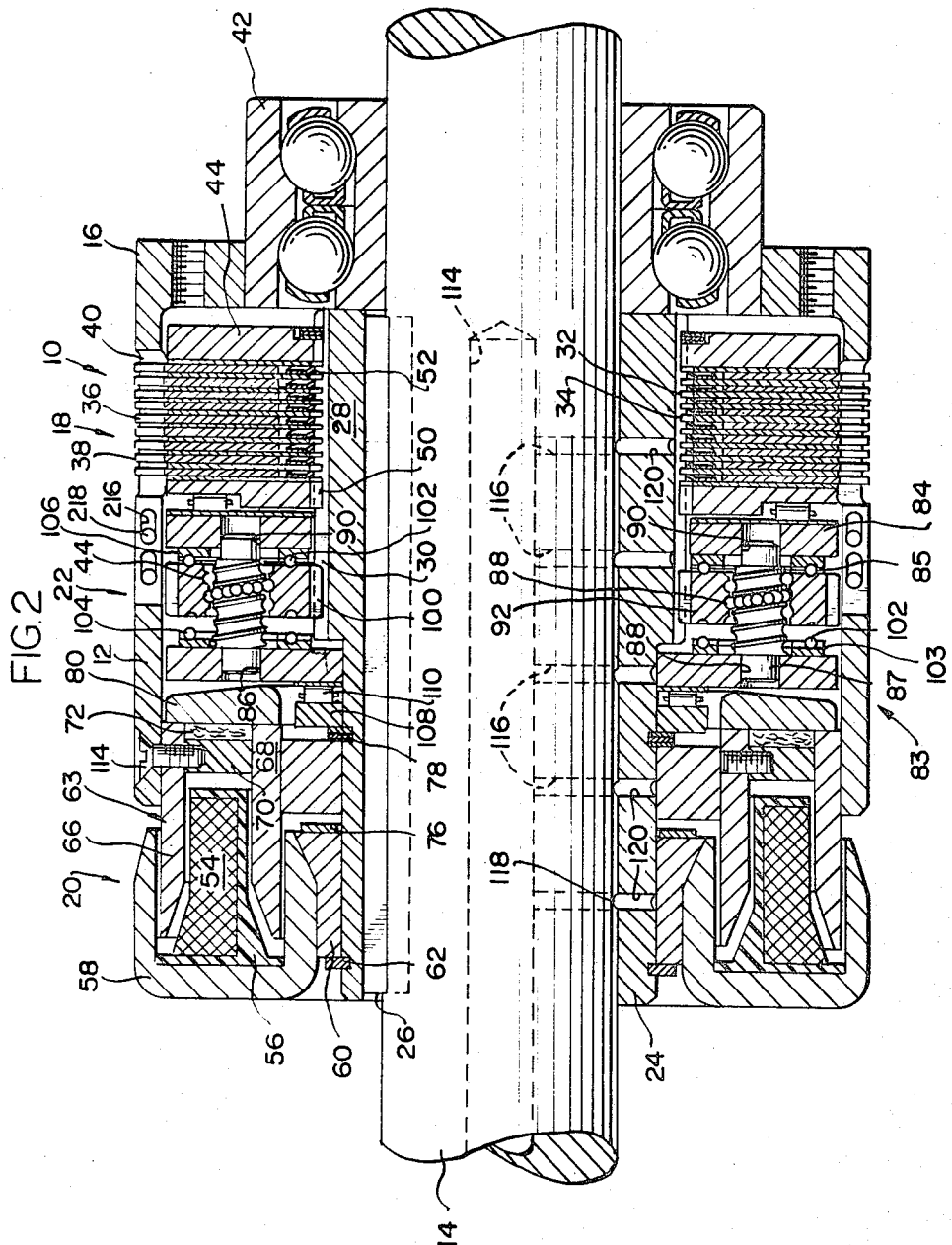
FIGURE 2 is a view similar to FIGURE 1 but showing the clutch elements in engaged position.
Figure 6:
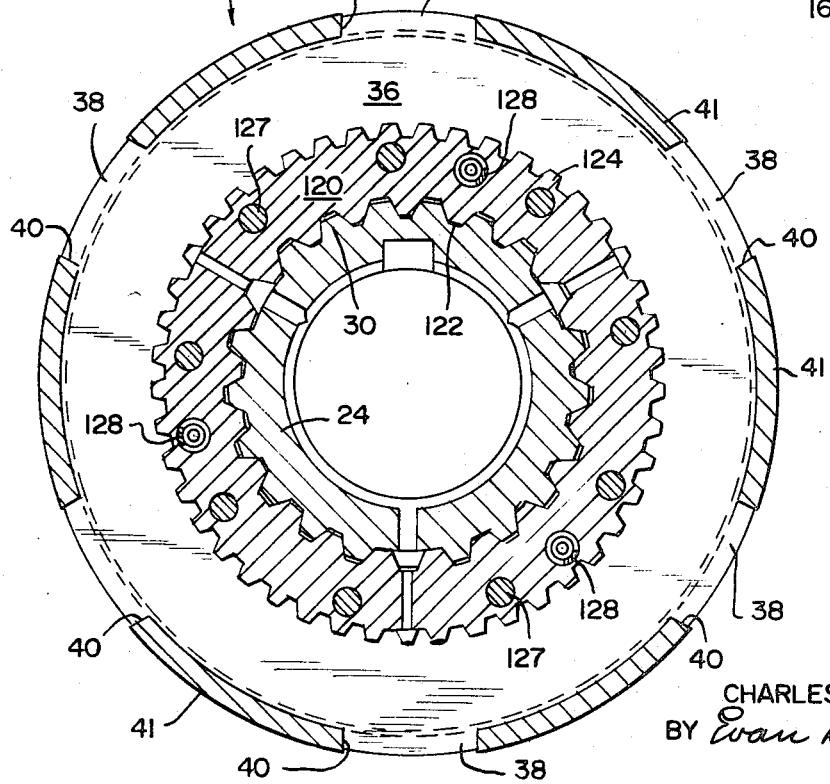
FIGURE 6 is a sectional view taken substantially on line 6—6 of FIGURE 3.

A hollow cylindrical hub 24 is keyed to the shaft 14 at 26 in surrounding relation thereto so as to rotate therewith. The right end of the hub 24, as viewed in FIGURES 1 and 2, is formed with a section 28, of increased diameter, having at the periphery thereof a plurality of splines 30. The disc pack assembly 18 includes a plurality of annular driving discs 32, formed with splines 34 at the inner periphery thereof in mesh with the splines 30. Interleaved with the annular discs 32 are annular driven discs 36. Either the discs 32 or the discs 36 may be faced on one side with a material having a relatively high resistance to wear and a relatively high coefficient in friction. The outer periphery of each of the discs 36 is formed with a plurality of circumferentially spaced tabs or tangs 38, received in axially extending slots 40 in the output member 16, see FIGURE 6. The slots 40 define axially extending fingers 41. The shaft 14 is illustrated as being journalled in a double ball bearing 42 on which the output member 16 rests. The discs 32 and 36 are free to move axially when the clutch is in the disengaged position and are capable of transmitting torque only when compressed in a manner hereinafter described.

An annular pressure plate 44 is affixed to the section 28 of the hub 24 by means of internal splines meshed with the splines 30 and axial movement of pressure plate 44 to the right is precluded by retainer ring 46. An annular axially slidable pressure plate 48 is positioned at the left side of the disc pack assembly 18 and has splines 50 at its inner periphery in mesh with the splines 30 on the hub 24. It will be understood that the pressure plates 44 and 48 rotate in unison with the discs 32 even in the disengaged position of the clutch and, when the clutch is engaged, the pressure plates 44 and 48 and the discs 32 and 36 all rotate in unison, provided delivered driving torque and driven torque demand do not exceed the frictional torque transmitting capability of the disc stack. The discs 32 and 36, in the disengaged position of the clutch, are maintained in spaced relation by means of wavy washer-shaped springs 52.

The electromagnetic pilot cluch 20 includes an annular coil 54 having a plurality of turns of electrically conductive wire through which direct current may be selectively transmitted to produce a magnetic field. The coil 54 is wound about a bobbin 56 and the electric current may be supplied through suitable lead wires, not shown. The bobbin 56 is mounted in an annular coil box 58 of channel cross-section, which in turn, is mounted on a bearing 60. Movement of the bearing 60 to the left is precluded by a retainer ring 62. Positioned within the coil box 58, in radially spaced relation thereto, is a pole piece subassembly 63 having an outer pole piece 66 and an inner pole piece 68 radially spaced each from the other by means of a spacer ring 70 which is set back from the right end edges of the pole pieces 66 and 68 to allow room for an annular friction facing 72. The pole piece assembly is mounted for free rotative movement on the hub 24, by means of a bearing 74. A thrust washer 76 is interposed between the bearing 60 and the bearing 74. Axial movement of the pole piece assembly to the right, as viewed in FIGURE 1, is limited by retainer rings 78. The pilot clutch assembly 20 also includes an annular armature 80 secured loosely to the force-amplifying means 22 by shouldered screws (not shown). These screws are desirably rigidly seated in a support ring 82, forming a part of the force-amplifying mechanism 22 but loosely fitted in circumferentially spaced openings (not shown), in the armature 80. This loose fit permits small relative movement between the armature 80 and the support ring 82, such as may be required to enable the armature 80 to fit snugly against the pole piece assembly 63 when the pilot clutch 20 is energized.

The force-amplifying mechanism 22 further includes an annular suport ring 84, of less radial dimension than the support ring 82 and having an inner periphery spaced from the splines 30 on the hub section 28. The rings 82 and 84 form a carrier indicated by reference numeral 83. Between the rings 82 and 84 of the carrier 83 are disposed a plurality of circumferentially spaced ball-screw units 85. The support ring 82 is formed with a plurality of circumferentially spaced non-circular openings 86, in each of which is received one end portion 87 of each screw 88. In like fashion the support ring 84 is formed with a plurality of circumferentially spaced non-circular openings 90 each maintained in register with one of the openings 86 by reception of the other end portion 89 of each screw 88. The openings 86 and 90 being of any cross-section other than circular, rotation of each screw 88 about its own axis is precluded. A nut 92 having internal grooves 94 is threadedly received on each screw 88 through the medium of a plurality of ball bearings 96 which are received in corresponding grooves 98 on the periphery of the screw 88. Means are provided in the nut 92 for returning the balls 96 in conventional fashion.

According to the present invention, each nut 92 is provided at its outer periphery with gear teeth 100 which are of a corresponding pitch and configuration as the splines 30 on the hub section 28. Each side face of each nut 92 is formed with an annular groove to serve as a ball bearing race for ball bearings 102, which cooperate with races 104 and 106, one at each side of the nut 92. The balls 102 are retained in operative position by cages 103. A ring 108 is positioned adjacent the retainer ring 78 to limit the leftmost position of the support ring 82. Axial friction of the support ring 82 is minimized by a thrust bearing 110. In like manner, a thrust bearing 112 is interposed between the support ring 84 and the pressure plate 48.

When the coil 54 is energized the pole piece subassembly 63 moves axially to the right from the disengaged position illustrated in FIGURE 1 to the engaged position illustrated in FIGURE 2. As the armature 80 engages the pole piece subassembly 63, relative rotation occurs between the entire force-amplifying mechanism and the hub 24 because of the connection between the armature 80 and the carrier 83. The carrier 83 is, in effect, braked while the hub 24 continues to rotate. As this rotation occurs, the nuts 92 advance on the splines 30 and, of course, relative rotation occurs between the nuts 92 and the screws 88 and the nuts 92 move to the right to exert an axial pressure on the disc pack assembly 18 through the support ring 84, the thrust bearing 112, and the pressure ring 48. When this occurs, torque is transmitted from the shaft 14 to the output member 16 through the disc pack assembly 18.

The coil box 58, outer pole piece 66, inner pole piece 68 and armature 80 constitute the magnetic circuit and as such are formed of a material made of high magnetic permeability. The bearings 60 and 74 and all other parts not forming a part of the magnetic circuit but in close proximity thereto are desirably formed of a material having low magnetic permeability to minimize leakage of flux.

It is contemplated that the clutch of the invention be operated with continuous circulated lubrication. With this in mind, the shaft 14 is provided with a central bore 114 in fluid communication with the plurality of radial bores 116 each of which is in fluid communication with one of a series of longitudinally spaced circumferential grooves 118 at the periphery of the shaft 14. The hub 24 is formed with a plurality of radial bores 120 one in register with each of the grooves 118. By this arrangement, lubricating oil may be supplied to the disc pack assembly 18, and the pilot clutch assembly 20 and the force-amplifying mechanism 22.

In order for the force-amplifying mechanism 22 to function, there must be a positive resisting torque between the armature 80 and the field pole subassembly 63. To this end, the housing 12, to which the pole piece subassembly 63 is secured by means of circumferentially spaced screws 114, has at the right end thereof, as viewed in FIGURES 1 and 2, a plurality of circumferentially spaced slots defining a plurality of circumferentially spaced fingers. The left end of the output member 16 is in the form of a sleeve having a plurality of circumferentially spaced slots defining circumferentially spaced fingers which are interleaved with the slots of the housing sleeve 12. In order to facilitate relative axial motion of the fingers, socket 216 are formed in each edge of such of the fingers of the housing sleeve 12 and in each of the sockets 216 is received a ball bearing 218. The ball bearings 218 are rollingly engaging the finger of the output member 16 and thus friction due to relative axial motion of the fingers is minimized.

In operation, the force-amplifying mechanism 22 normally rotates with the hub 24 and the nuts 92 remain fixed on the periphery of the hub. The disc pack assembly 18 is compressed, upon energization of the coil 54, by exerting a reaction on the carrier so that the nuts 92 advance on the splines 30 due to rotation about the screws 88. The pressure condition of the nuts 92 and screws 88 is illustrated in FIGURE 2. Reaction is applied to the carrier by movement of the pole piece subassembly 63 to the right, from the position illustrated in FIGURE 1 to the position illustrated in FIGURE 2. In the latter position, engagement is effected between the pole piece subassembly 63 and the armature 80. Since the output member 16 is initially stationary, the reaction force is transmitted through the fingers thereof to the meshing fingers of the housing sleeve 12 to the pole piece subassembly 63, the armature 80 and the carrier. The springs 52 are designed to maintain the discs 32 and 36 in spaced relation when the coil 54 is deenergized. The spring force is sufficient to overcome inertial forces which would tend to cause the nuts 92 to advance to the position of FIGURE 2 inadvertently. The reaction of the output member 16 exists as long as the angular speed of the shaft 14 exceeds the angular speed of the output member. When these speeds reach a 1:1 relation continued engagement of the disc pack assembly 18 is maintained, when the coil 54 is energized, by the inertial forces acting on the nuts 92 which tend to maintain the nuts 92 in a position shown in FIGURE 2. These inertial forces continue until the coil 54 is deenergized. At that time the springs 52 return the nuts 92 to the position shown in FIGURE 1, and the disc pack assembly 18 is disengaged.

Upon energization of the coil 54 a magnetic field is set up in which the lines of flux form closed loops, the planes of which lie at right angles to the direction of current flow, the summation of all such flux paths defining a toroidal field. This field is strongest where the magnetic reluctance is the least, i.e., through those materials having the highest permeability. The greatest flux density is in the coil box 58, the outer pole piece 66, the inner pole piece 68, and the armature 80; the least density of flux is through the surrounding air; and the next least density of flux is through the bearings 60 and 74, the support ring 82, and the housing sleeve 12, all of which are made from materials selected for their low permeability. Since it is the nature of the magnetic field to follow the shortest path available and to exert a magnetomotive force tending to shorten the flux path, a considerable attractive force exists across the air gaps in the magnetic circuit. The rigidity of the parts provides resistance to the attractive force at the radial air gaps between the coil box 58 and the poles 66 and 68. In addition, the attraction at the outer gap is counteracted by an attraction at the inner gap with the result that the net radial force in any direction is relatively small. Since the clutch is round, symmetrical, and of limited radial dimension, the total net radial force in all directions, with respect to the axis of the shaft 14, is zero. Also, since the attractive force across the air gaps between the ends of the pole pieces 66 and 68 and the mating face of the armature 80 is not counteracted by any magnetic force, and since the pole piece subassembly 63 is free to move axially, limited only by frictional resistance, the subassembly does move axially to the right upon energization of the coil 54, until it is in initial slipping engagement and then in full engagement wth the armature 80.

It will be appreciated that the attractive force across an air gap increases as the width of the gap diminishes and that, as a result, the clamping force holding the armature 80 and the pole piece subassembly 63 in engagement is considerable. For instance, applicant has made a pilot clutch of the approximate dimensions illustrated in FIGURES 1 and 2. In this model clutch parts were made from Armco magnetic ingot iron and the non-circuit parts were made of brass. Applicant was able to achieve 1,000 ampere-turns and a clamping force slightly in excess of 1,000 pounds. With this substantial clamping force at the inner face, the frictional resistance to relative rotation of the pole piece assembly and the armature is also substantial.

The movement of the nuts 92 to the position shown in FIGURE 2 causes axial pressure on the support ring 84 which is transmitted to the discs 32 and 36 by means of the pressure plate 48 and the thrust bearing 112. The clearance between the discs 32 and 36 is reduced until it reaches zero. At this point further axial motion is not possible but the pressure between the discs increases until the friction forces reach a value sufficient to rotate the output member 16, and/or, this not being possible, until the frictional resistance to rotation at the interface between the armature 80 and the subassembly 63 is exceeded, at which point slippage occurs at that interface. The former condition will occur in the case where the torque resistance of the load is some fixed value within the capacity of the clutch; the latter will occur when the driven machine, to which the output member 16 is connected, presents a high inertial resistance, under which condition slippage will continue until acceleration of the load has stopped. In the latter case, the capacity of the clutch may be limited by the allowable duration of the slip which is dependent upon heat dissipating ability, rather than by torque transmitting capability.

The screws 88 are designed to permit sufficient travel of the nuts 92 in either direction from the neutral position to provide sufficient clearance at each interface in the disc pack when the discs are new and an additional .005″ at each interface to compensate for wear of the discs. There is no need for a separate mechanism to compensate for disc wear since the screws 88 can be designed to provide greater travel of the nuts 92, if desired.

It will be appreciated that the clutch of the present invention would be operable if the functions of the input shaft 14 and the output member 16 were reversed.

Figure 3:
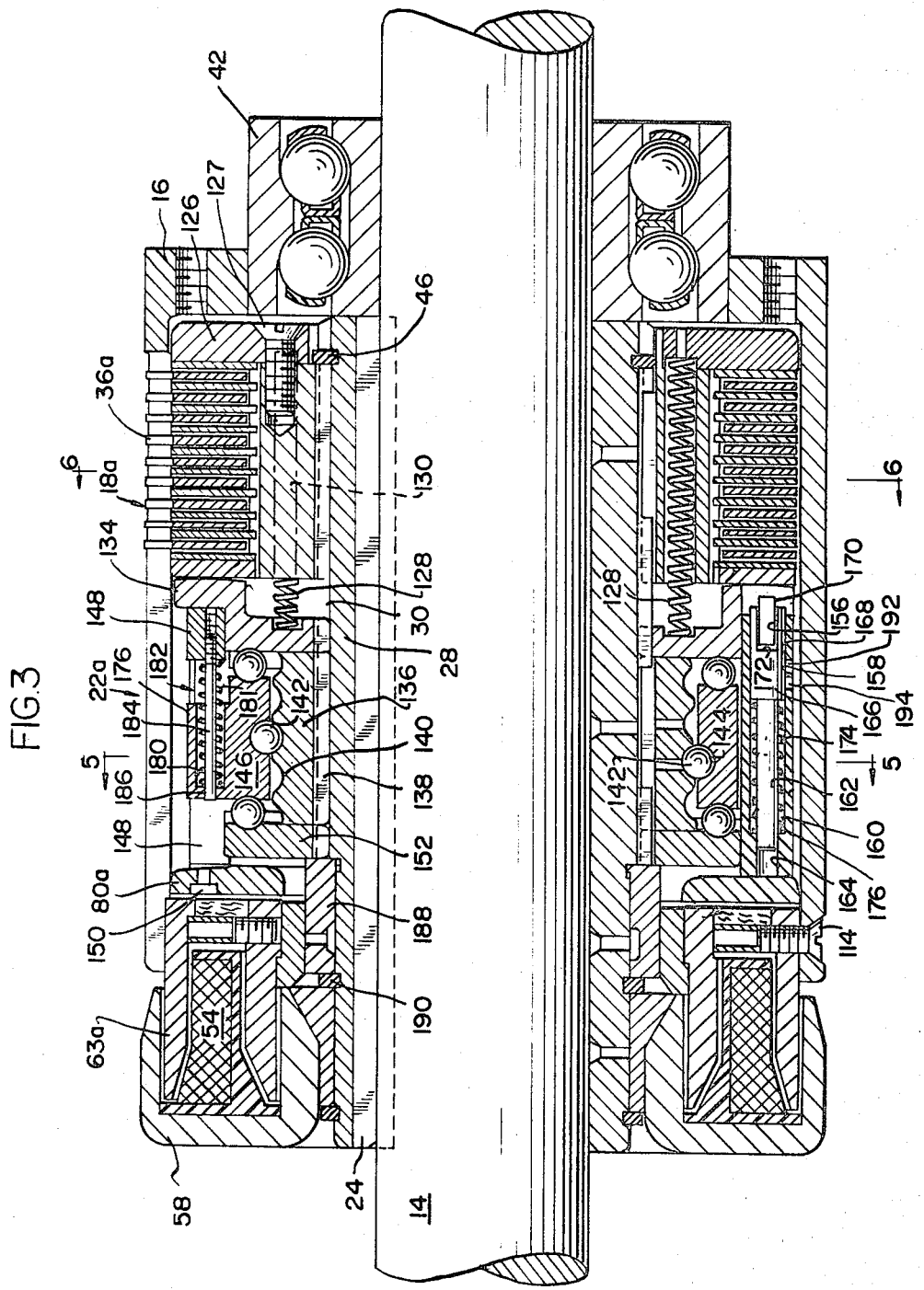
FIGURE 3 is an elevational sectional view in accordance with the clutch made in accordance with a further modified form of the invention with the clutch elements in disengaged position.
Figure 4:
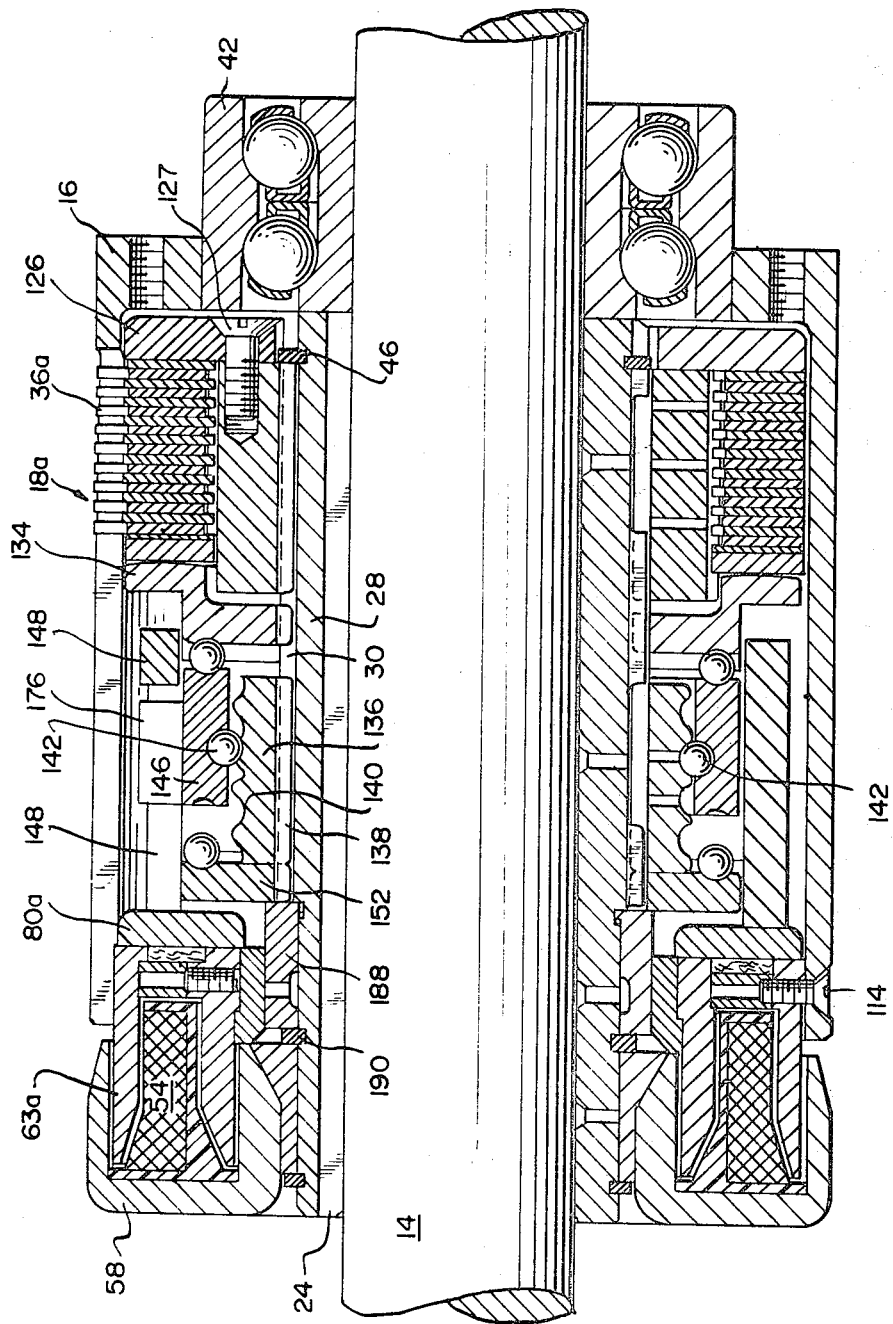
FIGURE 4 is a view similar to FIGURE 3 but showing the clutch elements in engaged position.

FIGURE 3 illustrates a clutch made in accordance with a modified form of the present invention with the constituent elements illustrated in disengaged condition, while FIGURE 4 illustrates the same clutch with the constituent elements illustrated in engaged condition. The clutch of this modified form of the invention has certain element which are identical in configuration and function to comparable parts of the principal form of the invention illustrated in FIGURES 1 and 2 and are indicated by identical reference numerals. In the modified form of the invention, an annular radial spacer 120 surrounds the section 28 of the hub 24, see FIGURE 6. This spacer 120 is formed with internal splines 122 in mesh with the splines 30 of the section 28 and external splines 124 in mesh with discs 32a. An annular pressure plate 126 is rigidly secured to the spacer 120 by means of circumferentially spaced screws 127. Movement of the spacer 120 to the right, from the position illustrated in FIGURE 3, is precluded by means of a retainer ring 46. The hub 24, the spacer 120 and the pressure plate 126 function as a unit and could be made in one piece, if desired. So also, the spacer 120 can be formed integrally with the hub 24 and the pressure plate 126 may be as illustrated.

In this form of the invention, the wavy-washer springs 52 have been eliminated and in lieu thereof there are provided a plurality of circumferentially spaced helical springs 128 each received in an axial bore 130 in the spacer 120. The left end of each of the springs is received in a recess 132 formed in pressure plate 134 to bias the pressure plate 134 to the left, as viewed in FIGURES 3 and 4 to separate driving discs 32a from driven discs 36a.

An important feature of this modified form of the present invention is the provision of an axially movable armature 80a which permits pole piece subassembly 63a to remain axially stationary in a position of maximum effectiveness with respect to the coil box 58. The fingers of the output member 16 extend directly to the subassembly 63a and are secured thereto by means of screws 114.

Another important feature of the modified form of the present invention is the provision of a force-amplifying mechanism 22a. In this form of the invention, an annular hollow screw 136 surrounds the hub section 28 and has at the inner periphery thereof sliding fit splines 138 in mesh with the splines 30 of the hub section 28. The outer periphery of the screw 136 is formed with helical grooves 140 in which are rollingly received a plurality of balls 142. The balls 142 are also rollingly received in grooves 144 in the inner periphery of an annular nut 146. Upon energization of the coil 54, the armature 80a moves to the left to engage the subassembly 63a. A nut retainer 148 is secured to the armature 80a by a plurality of circumferentially spaced screws 150 and is axially movable therewith. The nut retainer 148 may move axially relative to the nut 146 but is rotationally fixed therewith so that, upon movement of the armature 80a to the left, the armature 80a, which, in the disengaged position of the clutch, rotates with pressure plate 134, the screw 136, race 152, and nut 146, engages subassembly 63a so that the rotational speed of the armature 80a is reduced by the reaction of the output member 16, and the nut 146 rotates with respect to the screw 136 and moves axially to the right from the position shown in FIGURE 3 to the position shown in FIGURE 4. In the latter position, the pressure plate 134 is moved axially to the right, against the bias of the springs 128, to compress disc pack assembly 18a. It will be appreciated that the screw 136 would move to the right if the rotation were opposite.

According to another imprtant feature of the invention, positive means are provided to prevent inadvertent engagement of the disc pack assembly 18a, while the coil 54 is deenergized, due to inertial forces. To this end, axial movement of the nut 146 towards the position illustrated in FIGURE 4 is prevented by preventing relative rotary motion between the nut and the screw 136. The pressure plate 134 has a plurality of circumferentially spaced slots 156 in the outer flange thereof, and in each of these slots is received a plunger assembly 158. Each of the plunger assemblies 158 includes a tube-shaped body portion 160 slidably received in a bore 164, a guide rod 162 formed in the body portion 160, a plunger 166 slidably received in a counterbore 168, a roller 170 mounted for rotation in a longitudinally extending slot 172 formed in the plunger 166, and a spring 174 mounted in the bore 168 and extending between the plunger 166 and a shoulder 176, at the inner section between the counterbore 166 and the bore 164. The plunger assemblies 158 are received in circumferentially spaced bores in the nut retainer 148 and the rollers 170 are biased to the right by the spring 174. Thus, relative rotation between the pressure plate 134 and the nut retainer 148 is prevented since both the pressure plate 134 and the screw 136 are prevented from rotating relative to the hub 24 by the splines 30 and 138, relative rotation between the nut retainer 148 and the screw 136 is prevented.

Figure 5:
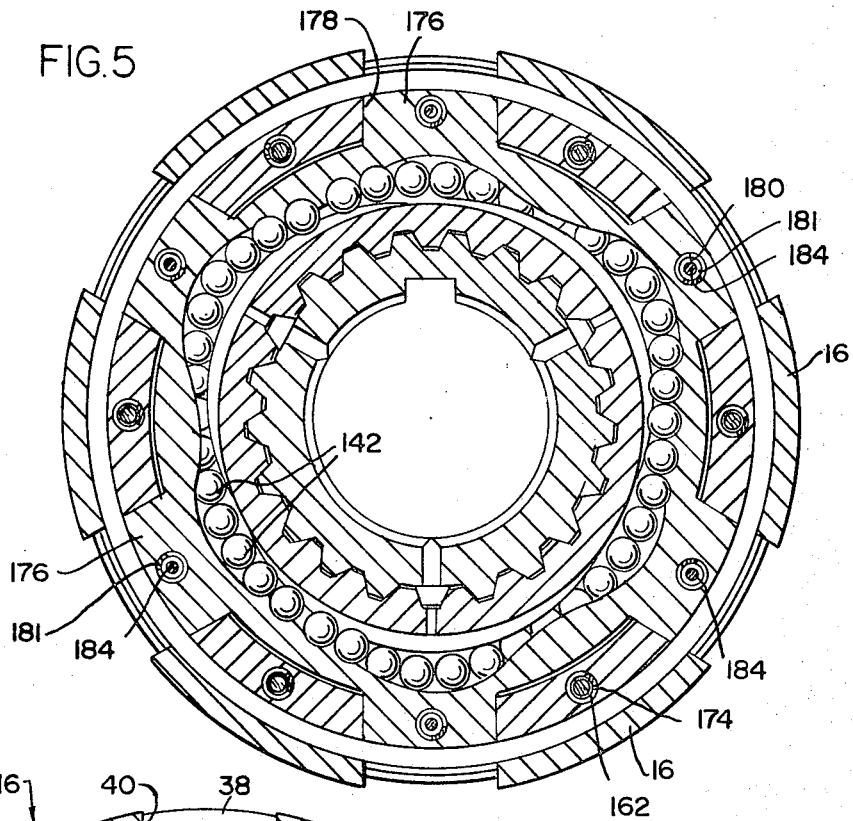
FIGURE 5 is a vertical sectional view taken substantially on line 5—5 of FIGURE 3.

Extending radially outwardly from the nut 146 are a plurality of circumferentially spaced lugs 176, see FIGURE 5. These lugs are received in axially extending slots 178 formed in the nut retainer 148. The slots 178 of the nut retainer 148 define axially extending fingers 179, in the end of which the screws 150 are received and the bores 164 formed. Thus, the nut retainer 148 and the nut 146 can move axially relative to each other but are mutually rotationally fixed. Each of the lugs 176 is formed with a bore 180. In each of the bores 180 is received a spring assembly 182. Each spring assembly 182 includes a guide rod 184 the right end of which, as viewed in FIGURES 3 and 4, is threadedly received in the retainer 148, and the left end of which passes through a bore 186 in the left side of the lug 176, as viewed in FIGURES 3 and 4 and a spring 181. When the coil 54 is deenergized, the nut 146 is returned from the position illustrated in FIGURE 4 to the position illustrated in FIGURE 3 by the force of the spring 128.

The springs 128 urge the movable pressure plate 134 as far to the left as possible and the springs 182 bias the retainer 148 into engagement with the pressure plate 134. The springs 182 also bias the plunger assemblies 158 as far out of the nut retainer 148 as a guide peg 192, extending radially outwardly from the plunger 166, is permitted to travel in an elongated slot 194 formed in the body portion 160. Thus contact is maintained between the pressure plate 134 and the nut retainer 148 and the plunger assemblies 158 are kept in the slots 156.

As pointed out above, the armature 80a is connected to the nut retainer 148, and is axially movable therewith. The several parts are desirably dimensioned so that when the pressure plate 152, the sleeve 188, the screw 136, the movable pressure plate 134, and the nut retainer 148 are all as close together as the various springs will push them, then the armature 80 will clear the face of the subassembly 63a by a limited extent, in the order of 1/16". When the coil 54 is energized, the armature 80a is moved to the left and carries the nut retainer 148 and the rollers 170 about the same extent to the left, and the springs 180 are also compressed to the same extent. As a result, the centers of the rollers 170 are moved slightly outside of the slots 156, so that the rollers ride on the left surface of the plate 134, and relative motion between the unit 146 and the screw 136 is made possible. Upon deenergization of the coil 54, the rollers 170 again project into the slots 156.

Because of the low coefficient of friction of the balls 142 with respect to the nut 146 and the screw 136, the nut 146 is returned to the neutral position under the influence of the springs 128. So also, the armature 80a and the nut retainer 148 are moved to the right, as viewed in FIGURES 3 and 4, and the rollers 170 again drop into the slots 156. This condition is maintained until the coil 54 is reenergized.

In FIGURE 7 is shown a modified form of the invention in which a housing 12a is utilized, in lieu of the housing 12 and output member 16 of the form of the invention illustrated in FIGURE 1. The housing 12a is provided with a plurality of circumferentially spaced longitudinally extending slots 17a at the right end thereof for reception of the tangs 38 of the output discs 36. By this arrangement the housing sleeve is relatively rigid. Furthermore, torque is transmitted directly to a ring 19. The housing sleeve 12a is secured directly to the ring 19 by means of a plurality of circumferentially spaced tangs 23 received in correspondingly disposed slots 25 at the right edge of the housing sleeve 12a. The screws 21 are utilized to secure the housing sleeve 12a to the ring 19.

Figure 7A:
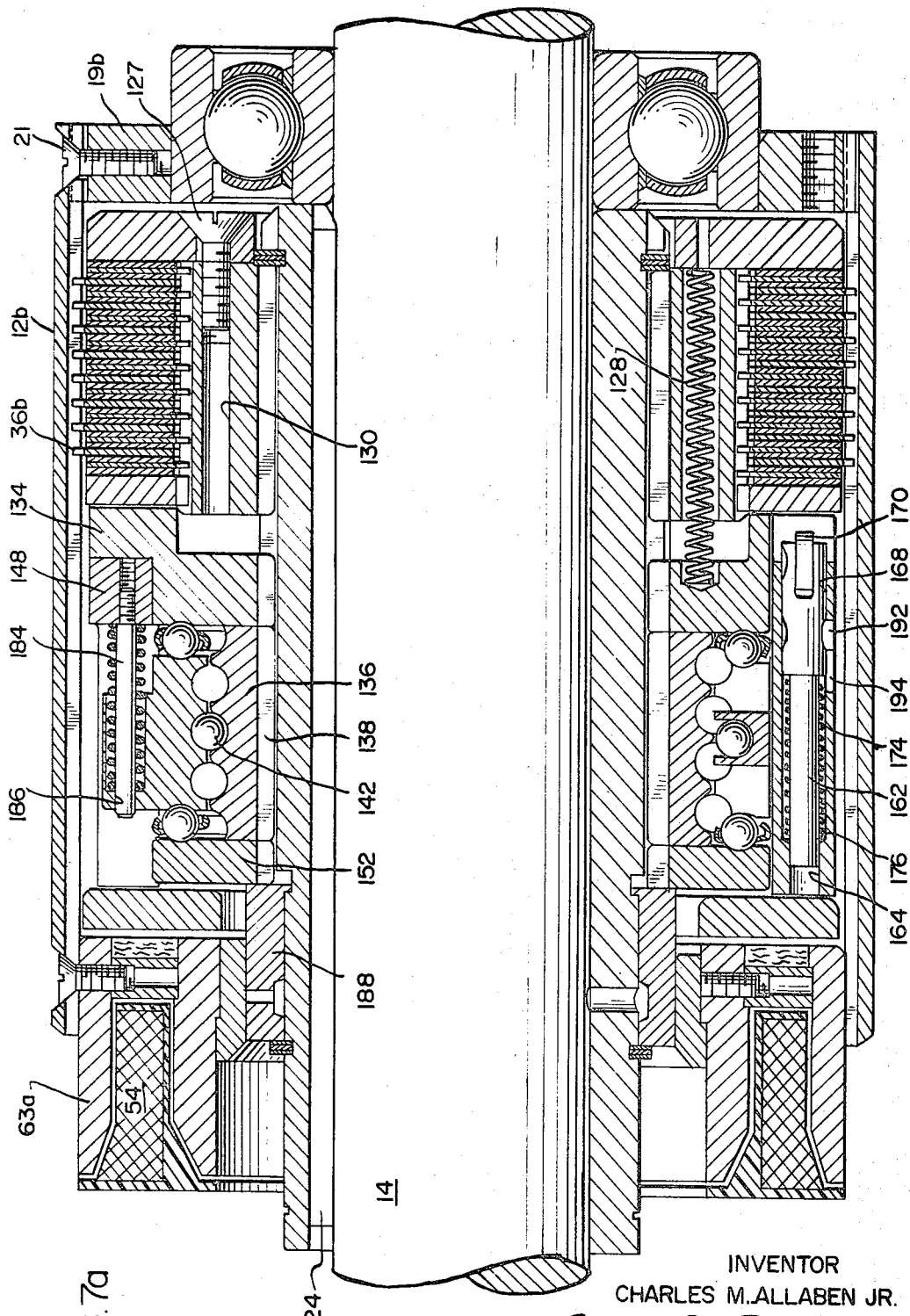
FIGURE 7a is a further modified form of the present invention.

In FIGURE 7a is illustrated a further modified form of the present invention in which the slots are eliminated and in which the internal surface of housing sleeve 12b is formed with an internal spline 27. The outer periphery of output discs 36b are correspondingly splined. So also of the outer periphery of ring 19b.

The clutch of the above invention exhibits important advantages over clutches of this type heretofore known. For instance, the force-amplifying mechanisms of the several forms of the invention permit the use of an actuator of limited axial and radial dimension. The force exerted on the disc pack assembly is even throughout an annular path for effective engagement. The lock of the modified form of the invention effectively prevents inadvertent engagement of the disc packs.

Applicant does not intend to be limited by the scope of the above-described invention, but rather by the scope of the appended claims.

I claim:

1. A clutch comprising an input member, a disc pack assembly mounted in surrounding relation to said input member, an output member, an electromagnetic pilot clutch assembly mounted in surrounding relation to said input member and in axial spaced relation to said disc pack assembly, and an annular force-amplifying mechanism having a plurality of circumferentially spaced ball-screw units interposed between said pilot clutch assembly and said disc pack assembly and adapted to amplify the force of said pilot clutch assembly to effect relative rotation in each of said ball-screw units and effect engagement of said disc pack assembly.

2. A clutch in accordance with claim 1, wherein each of said ball-screw units includes a screw and a nut and wherein a reaction is exerted to effect relative axial movement between said nut and said screw to compress said disc pack assembly.

3. A clutch in accordance with claim 1, wherein each of said ball-screw units includes a nut and a screw and said pilot clutch assembly includes a pole piece subassembly and an annular armature relatively movable axially with respect to said subassembly for engaging said subassembly to effect reaction and relative motion between each nut and screw.

4. A clutch comprising an input member, an output member, a disc pack assembly adapted upon engagement drivingly to connect said input member and said output member, force-amplifying means driven by said input member and adapted upon actuation to convert torque into axial motion to effect engagement of said disc pack assembly, an externally splined hub mounted on said input member for rotation therewith, said force-amplifying means comprising an annular carrier mounted in surrounding relation to said input member, said carrier comprising a pair of annular support rings disposed in axially spaced relation, a plurality of circumferentially spaced screw units mounted between said support rings, each of said screw units including a screw non-rotatably mounted with respect to said support rings and a nut threadedly received on said screw, each of said nuts having external splines in mesh with the splines of said hub, and means to brake said carrier so that said nuts advance on the periphery of said hub, rotate with respect to said screws and move axially to compress said disc pack assembly.

5. A clutch in accordance with claim 4, wherein said electromagnetic pilot clutch assembly comprises a pole piece subassembly movable axially to engage an annular armature connected to said carrier.

6. A clutch in accordance with claim 4, wherein said electromagnetic pilot clutch assembly includes an axially fixed pole piece subassembly and an axially movable annular armature engageable with said pole piece subassembly to connect said carrier to said output member.

7. A clutch comprising an input member, an output member, a disc pack assembly adapted upon engagement drivingly to connect said input member and said output member, force-amplifying means driven by said input member and adapted upon actuation to convert torque into axial motion to effect engagement of said disc pack assembly, a hub mounted on said input member for rotation therewith, said hub having at one end thereof external splines, said disc pack assembly comprising a plurality of driving discs splined to said hub and a plurality of interleaved driven discs keyed to said output member, said force-amplifying mechanism comprising a plurality of circumferentially spaced ball-screw units mounted in surrounding relation to the other end of each hub, a nut threadedly received on said screw, an axially movable armature and means for actuating said force-amplifying means, said last-named means including an electromagnetic pilot clutch assembly operable upon energization to effect axial movement of said armature to prevent relative rotary motion between each nut and said output member thereby effecting axial movement of each screw to exert pressure on the disc pack assembly.

8. A clutch in accordance with claim 7, wherein means are provided to prevent inadvertent engagement of said disc pack.

9. A clutch in accordance with claim 7, wherein locking means are provided to prevent inadvertent axial movement of said nut, said locking means being releasable to its disengaged position in response to movement of said armature to engaged position.

10. A clutch in accordance with claim 7 wherein a housing sleeve is utilized positively to connect said driven discs to said output member.

11. A clutch in accordance with claim 10 wherein said housing is provided with a plurality of circumferentially spaced slots for reception of tangs extending radially outwardly from said driven discs and said output member.

12. A clutch in accordance with claim 10 wherein said housing sleeve is internally splined and wherein the peripheries of said driven discs and said output member are meshingly splined therewith.

References Cited

UNITED STATES PATENTS

| | | | |
|---|---|---|---|
| 2,091,268 | 8/1937 | Colman | 192—69 |
| 2,933,171 | 4/1960 | Kraeplin | 192—69 |
| 2,937,729 | 5/1960 | Speer | 192—35 |
| 2,947,393 | 8/1960 | Grover | 192—35 |
| 3,288,257 | 11/1966 | Ulbing | 192—35 |

MARTIN P. SCHWADRON, *Primary Examiner.*

CHARLES M. LEEDOM, *Assistant Examiner.*

U.S. Cl. X.R.

192—67, 70.22, 84, 94